April 15, 1958 J. J. ZIMMERMAN 2,830,918

PRINTED CIRCUIT PANEL

Filed Oct. 30, 1953 2 Sheets-Sheet 1

INVENTOR.
Jack J. Zimmerman,
BY Mueller & Aichele
Att'ys.

INVENTOR.
Jack J. Zimmerman,
BY
Mueller & Aichele
Atty's.

United States Patent Office 2,830,918

Patented Apr. 15, 1958

2,830,918

PRINTED CIRCUIT PANEL

Jack J. Zimmerman, Riverside, Ill., assignor to Motorola, Inc., Chicago, Ill., a corporation of Illinois Application October 30, 1953, Serial No. 389,283

1 Claim. (Cl. 117—212)

The present invention relates to plated circuit processes and products in which electrical conductor means are formed on at least one surface of an insulating base or panel, and the invention is directed more particularly to a method for enhancing the electrical insulating characteristics of such an insulating base so as to prevent electrical leakage between the electrical conductors of the electrical conductor means on the surface thereof.

Prior to the commerical use of plated circuit techniques in the manufacture of radio chassis and the like, the usual procedure was to assemble and secure the various larger components of a radio receiver to a suitable perforated and formed chassis. Other smaller components such as fixed capacitors and resistors were then crimped in place by their pigtail connections, and interconnecting wires were cut to length and likewise secured by crimping. A manual soldering bond was then made to each of the crimped connections. Needless to say, the above manufacturing procedure involved a large amount of skilled labor.

In recent years plated circuit techniques have been developed in an effort to reduce the amount of skilled manual labor required to assemble and wire a radio receiver or the like. The usual procedure is to apply a design of conductive material corresponding to the circuit involved to at least one surface of an insulating panel composed, for example, of a phenolic condensate such as Bakelite or the like. It has proven difficult, however, to provide a plated circuit assembly in which the design of conductive material is rigidly and firmly attached to the insulating panel.

One method for increasing the adhesion of the conductive design to the insulating panel is to sandblast or otherwise roughen the surfaces of the panel to which the design is to be affixed. Although this method has been found to improve adhesion materially, it has also been found under certain circumstances to cause some moisture absorption in the roughened surface. This increases the tendency for electrical leakage between the various conductors in the conductive design.

Another method of increasing the adhesion between the conductive design and the insulating panel is to provide an adhesive layer therebetween. However, adhesive layers that have proved suitable for the desired degree of adhesion between the conductive design and the panel have not exhibited the desired degree of moisture repellence so as to inhibit the occurrence of the electrical leakage referred to above.

It is clear that one method of solving the moisture problem outlined above is to coat the entire panel and conductive design thereon with a moisture repellent film formed over the conductors of the conductive design and on the surface of the insulating panel between such conductors so as to form a moisture proof package. However, such a method has not been considered in the past since it was believed that to encase the conductive design would render it impossible to make the desired subsequent solder connections to the various terminal points on the conductive design. The present invention provides, however, a moisture repellent coating for the insulating panel and the conductive design thereon that not only enhances the electrical insulating characteristics of the insulating panel so as to prevent short circuits between the various conductors of the conductive design, but also assists rather than impedes soldering of connections to the various terminal points on the conductive design.

It is, accordingly, a general object of the present invention to provide an improved process for enhancing the electrical insulating characteristics of an insulating panel which has an electrically conductive design formed on at least one surface thereof.

Another object of the invention is to provide such an improved process for forming a protective coating over an insulating base and electrical conductor means thereon, which coating assists in subsequent soldering operations to various terminal points on the conductor means.

Yet another object of the invention is to provide such an improved plated circuit panel which is constructed to exhibit a high degree of moisture repellence and yet which may be soldered easily and conveniently.

A still further object of the invention is to provide an improved plated circuit panel which comprises an insulating base with conductor means on at least one surface thereof and a moisture repellent film completely encasing the base and conductor means, and which is so constructed that soldering connections to various terminal points on the conductor means is greatly facilitated.

A feature of the invention is the provision of a process for providing a moisture repellent coating over the conductive design of a plated circuit panel and over the portions of the surface of the panel between the various conductors of such a design, such coating vaporizing upon the application of heat to selected areas thereof so as to enable soldering connection to be made to various terminal points of the conductive design underlying such areas.

Another feature of the invention is the provision of such an improved process in which the coating described above incorporates a soldering flux so that subsequent soldering to various terminal points on the conductive design may be made directly without any preliminary fluxing step.

Yet another feature of the invention is the provision of a plated circuit panel which is enclosed in a moisture repellent coating so as to preclude the formation of short circuits between the various conductors forming the plated circuit, which coating is capable of being vaporized upon the application of heat to selected areas of the plated circuit and, at the same time, provides a soldering flux for soldered joints to be made to such areas.

The above and other features of the invention which are believed to be new are set forth with particularity in the appended claim. The invention itself, however, together with further objects and advantages thereof may best be understood by reference to the following description when taken in conjunction with the accompanying drawings in which:

Figures 1, 2, 3, 4:
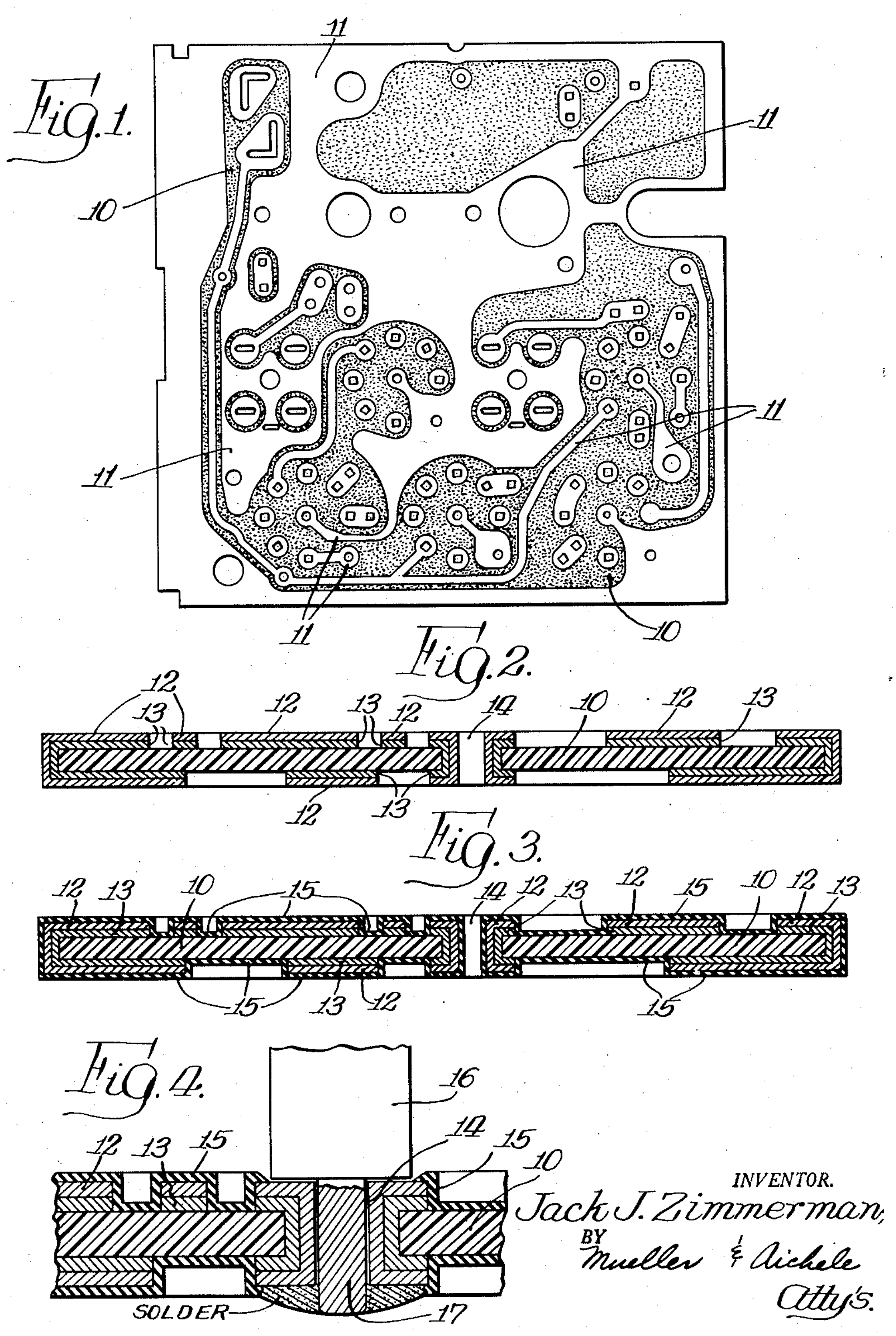
Fig. 1 is a plan view of a typical plated circuit panel.
Fig. 2 is a sectional view of the panel taken along the line 2—2 of Fig. 1.
Figure 5:
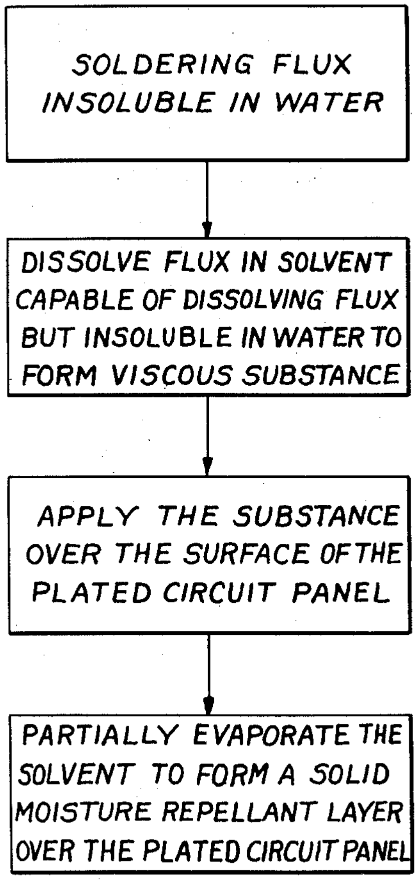
Figure 6:
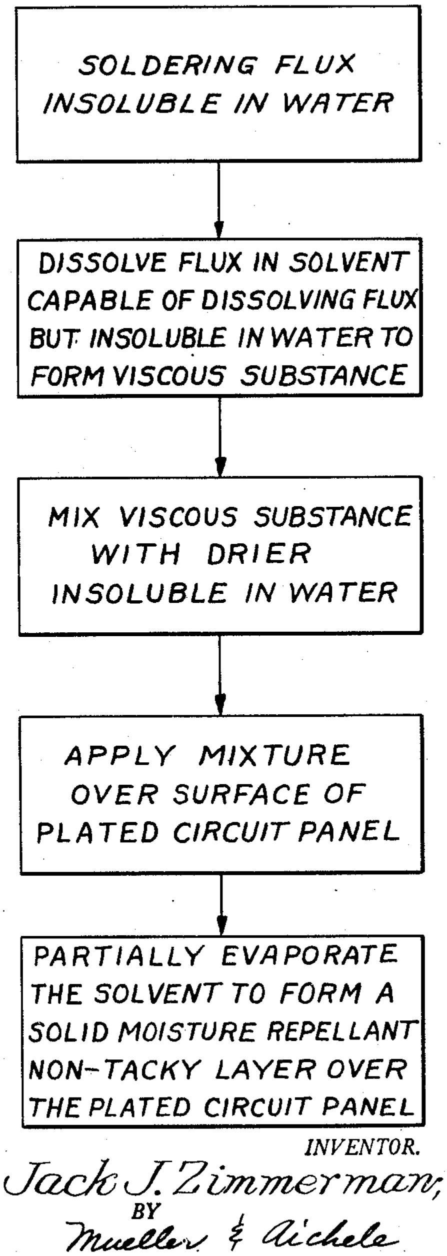

Fig. 3 is a sectional view of the panel similar to that of Fig. 2 in which the entire panel and conductive design thereon is completely encased by a flux coating in accordance with the invention, Fig. 4 is a fragmentary sectional view of the panel showing an electrical component soldered to a terminal point of the plated circuit, and Figs. 5 and 6 are schematic representations of various steps in the improved process of the present invention.

The invention provides a method of treating an insulated base having electrical conductor means on at least one surface thereof so as to enhance the electrical insulating properties of the base. The method includes applying a substance including a soldering flux and a solvent capable of dissolving such flux to at least the surface of the base having the electrical conductor means thereon and over such conductor means, and vaporizing the solvent from the substance to provide a moisture repellent layer including such soldering flux over such surface of the base and over the conductor means thereon.

The invention also provides an electrical chassis comprising an insulating base with electrical conductor means formed on at least one surface of the base, and a moisture repellent layer including soldering flux formed over at least the one surface of the base and over the conductor means thereon. This layer is capable of being vaporized and of fluxing areas of the conductor means upon the application of heat to such an area.

The plated circuit panel shown in Figs. 1 and 2 comprises an insulated base 10 having electrical conductor means 11 formed thereon to constitute a conductive design corresponding to the circuit involved. The conductor means may be formed on the insulated base 10 in accordance, for example, with the teaching of co-pending application Serial No. 297,285, now Patent No. 2,699,425, filed July 5, 1952, in the name of Temple Nieter, entitled "Electroplating Process," and assigned to the present assignee. This co-pending application discloses a method in which the surface of the insulated base 11 is roughened by sandblasting or by other means and is then covered with a metallic base coat composed, for example, of silver. Resist is stencil screened onto the portions of the base coat upon which no conductor is to appear, and the resulting assembly is then electroplated to form a second metallic coating, such as copper, over the portions of the base coat that are not covered by the resist. The resist and the portions of the base coat covered thereby are subsequently removed to produce a plated circuit panel comprising an insulated base with conductor means thereon corresponding to a desired electrical circuit.

As shown in Fig. 2, the conductive design may be formed on both sides of the insulated base 10 and comprises electrical conductor means 12 formed on the remaining portions of the metallic base coat 13. As also described in the co-pending application referred to above, the insulated base 10 may be provided with apertures therein which receive the base coat and final conductive layer so as to form electrically conductive terminals, or connections from one side of the base to the other. One such terminal is shown as 14 in Fig. 2.

As previously stated, plated circuit panels constructed in the manner described above have proven to be generally satisfactory. However, when the surface of the insulated base 11 is roughened to improve the adhesion of the base coat, the insulating characteristics of the surface are affected and, under some circumstances, leakage is liable to develop between the various conductors of the conductive design on the insulating base.

In accordance with the present invention, and as a final step in the fabrication of the plated circuit panel, the assembly of Figs. 1 and 2 is dipped in a moisture repellent substance, or is sprayed with such a substance. This substance preferably covers the entire surface of the panel and completely encloses the panel and the electrical conductor means thereon to form a hard impervious moisture repellent package. A sectional view of the resulting assembly is shown in Fig. 3 with the plated circuit panel being completely encased by a moisture repellent layer 15.

This layer 15 is composed of a substance capable of being vaporized and of fluxing areas of the electrical conductor means upon the application of heat to such areas without destroying the moisture repellent characteristics of the coating in so far as other portions of the conductive design are concerned. Electrical components may, therefore, be soldered to any terminal points of the plated circuit panel, with the soldering being facilitated by the fluxing action of the layer and requiring no additional fluxing.

Fig. 4 shows an electrical component 16 which may, for example, be a fixed capacitor or resistor, and which has a pigtail connection 17 extending downwardly through terminal 14. The application of heat and solder to the protruding portion of pigtail connection 17 causes the coating 15 to vaporize at that particular area and form a suitable flux for the solder. At the same time, however, coating 15 remains intact for the other portions of the plated circuit and preserves the moisture repellent characteristics of the panel.

The protective moisture repellent coating 15 may be formed in the manner illustrated schematically in Fig. 5. As a first step, a soldering flux which is insoluble in water is provided. The most common type of such flux is, of course, powdered rosin. As is well known, rosin is insoluble in water but is soluble in alcohol, turpentine, toluene, and in other known solvents. The solvent toluene has the desirable characteristics of also being insoluble in water; so that it is preferred that the rosin be dissolved in the toluene, or other water insoluble solvent, to provide a viscous solution or substance. It has been found that a suitable consistency can be obtained by mixing 50% powdered rosin with 50% toluene (by weight).

The resulting substance is then coated over the plated circuit panel of Figs. 1 and 2 and this may be performed by spraying or dipping. The resulting coated plated circuit panel is then placed in a drying oven and dried for 10–12 minutes at 150° F. to evaporate the solvent and, thereby, to form a moisture repellent layer over the plated circuit panel, such as shown in Fig. 3. It is important to maintain the oven temperature below the melting point of the soldering flux used so as to prevent melting of the flux and absorption thereof by the panel. The resulting coating vaporizes upon the application of heat to selected areas of the plated circuit panel, and the inclusion of soldering flux in the coating produces flux vapor which has been found adequately and completely to provide all the desired fluxing necessary for soldering connections to various points on the plated circuit panel. In fact, the fluxing action of the coating has been found to be sufficient even when projecting connections from electrical components are soldered to various points on the circuit.

Although the coating produced in accordance with the steps of Fig. 5 has been found to be completely satisfactory as a moisture repellent sheath for the plated circuit panel and as a fluxing means for soldering operations performed on the plated circuit, it has a disadvantage in that it has been found difficult to dry the coating sufficiently so that the resulting layer is not tacky. It is preferred, therefore, to insert a substance into the coating capable of reacting with the coating so that the resulting layer is hard and has no tacky characteristics, and which substance may conveniently be termed a "dryer".

The latter method is shown in Fig. 6, which comprises the same steps as the method of Fig. 5 with the exception that the resulting viscous substance obtained by dissolving the flux in the suitable solvent is mixed with a dryer that is also insoluble in water. Isobutylmethacrylate in a solution of Cellosolve and toluol (commercial toluene) in which the methacrylate is 15% solids by weight has been used to constitute a satisfactory dryer. It has been found that when this dryer is used, the resulting coating is hard but not brittle and is not tacky as in the previous instance. Moreover, the resulting coating has been found to vaporize readily and release vaporized rosin on the application of heat so as to assist in soldering in the manner previously described. An additional advantage in the use of methacrylate is that it is not as susceptible to vaporization as the solder flux, and areas of the panel adjacent to the points where soldering is performed maintaining a hard water repellent film of methacrylate even though the flux has been vaporized therethrough.

Polystyrene or copolymers of polystyrene may be used in place of the methacrylate, and these have been found to provide higher softening temperatures and improved moisture repellent characteristics in the coating. Moreover, chlorinated polystyrene may also be used.

The invention provides, therefore, a new and improved technique and resulting product, by means of which the electrical insulating characteristics of a plated circuit insulated base are materially enhanced without militating in any way against the ease with which subsequent solder connections may be made to the panel.

While particular embodiments of the invention have been shown and described, modifications may be made and it is intended in the appended claim to cover all such modifications as fall within the true spirit and scope of the invention.

I claim:

In a printed circuit panel for use in an electrical device, with electrical components mounted on and soldered to the panel, said panel including a plastic insulating base having predetermined spaced holes extending from one surface to another of the base, the combination of a pattern of metallic conductors covering a portion only of at least one of the surfaces of the base and metallic conductor material in the bores of the spaced holes lying within the metallic conductor pattern, some of said metallic conductors in said pattern being electrically unconnected to one another and being separated from one another by uncovered portions of the surface of the base, and a continuous layer of water-repellant-solder-fluxing rosin capable of being vaporized on direct contact with hot solder, which continuous layer coats said metallic conductors and the portions of the base surface not covered by said metallic conductors and coats the metallic conductor material in the bores of the holes within the conductor pattern, said continuous layer of rosin being in a hardened condition on said printed circuit panel so that the panel may be handled for subsequent assembly in an electrical device without disturbing such layer as a protective coating thereon, and said continuous layer of water-repellant-solder-fluxing rosin acting as flux for a subsequent soldering operation on the printed circuit panel.

References Cited in the file of this patent

UNITED STATES PATENTS

| | | |
|---|---|---|
| 1,726,100 | Da Costa | Aug. 27, 1929 |
| 1,989,557 | Muller | Jan. 29, 1935 |
| 2,441,960 | Eisler | May 25, 1948 |
| 2,445,431 | Hill | July 20, 1948 |
| 2,482,923 | McCoy | Sept. 27, 1949 |

FOREIGN PATENTS

| | | |
|---|---|---|
| 586,642 | Great Britain | Mar. 26, 1947 |